United States Patent [19]

Gordon

[11] 3,917,728
[45] Nov. 4, 1975

[54] PURIFICATION OF VINYL CHLORIDE
[75] Inventor: Ronnie D. Gordon, Richardson, Tex.
[73] Assignee: Continental Oil Company, Ponca City, Okla.
[22] Filed: Sept. 26, 1974
[21] Appl. No.: 509,371

Related U.S. Application Data
[63] Continuation-in-part of Ser. No. 311,187, Dec. 1, 1972, abandoned.

[52] U.S. Cl. .......................... 260/656 R; 260/652 P
[51] Int. Cl.$^2$ ........................................ C07C 21/06
[58] Field of Search .................... 260/652 P, 656 R

[56] References Cited
UNITED STATES PATENTS

| | | | |
|---|---|---|---|
| 3,125,609 | 3/1964 | Montgomery | 260/656 R |
| 3,142,709 | 7/1964 | Gause et al. | 260/656 R |
| 3,267,644 | 8/1966 | Jacobowsky | 260/656 R |

FOREIGN PATENTS OR APPLICATIONS

| | | | |
|---|---|---|---|
| 106,378 | 5/1963 | Netherlands | 260/656 R |
| 1,100,048 | 1/1968 | United Kingdom | 260/656 R |

*Primary Examiner*—D. Horwitz
*Attorney, Agent, or Firm*—Bayless E. Rutherford, Jr.

[57] ABSTRACT

Vinyl chloride containing minor amounts of butadiene is purified by intimately contacting said impure vinyl chloride with a highly acidic silica-alumina catalyst selected from the group consisting of synthetic silica-alumina catalysts and acidic naturally-occurring clays such as montmorillonite and kaolinite.

12 Claims, No Drawings

PURIFICATION OF VINYL CHLORIDE

Cross-Reference to Related Applications

The present application is a continuation-in-part of Application Ser. No. 311,187, filed Dec. 1, 1972, and now abandoned.

Background and Field of Invention

As is well known, vinyl chloride is a material of unusual importance in that it is used to prepare polyvinyl chloride, one of the major polymers of present-day commerce.

Unfortunately, several of the methods of preparing vinyl chloride produces a product containing minor quantities of butadiene. Butadiene in only trace quantities acts to inhibit the polymerization of vinyl chloride.

The present invention is directed to a method of purifying vinyl chloride containing butadiene as an impurity. Stated differently, the present invention is directed to the removal of butadiene from impure vinyl chloride containing this material.

Prior Art

Prior to preparing the subject application, a Washington associate performed a search to locate relevant art. Upon consideration by Applicant's attorneys and agent, the more pertinent art is considered to be the following:

U.S. Pat. No. 2,965,687 teaches the use of a quaternary ammonium derivative of a clay mineral (montmorillonite) to separate organic vapors (e.g., benzene or toluene) from inert gases (e.g., nitrogen).

U.S. Pat. No. 3,125,608 teaches a method for removing butadiene from vinyl chloride in the gaseous phase by heating the vinyl chloride with hydrogen in the presence of a catalyst (nickel, palladium, platinum) supported upon an inert carrier (alumina, diatomaceous earth, kieselguhr, silica gel).

U.S. Pat. No. 3,125,609 teaches a method similar to U.S. Pat. No. 3,125,608 except that it uses cupric chloride.

U.S. Pat. No. 3,267,644 teaches a process of drying vinyl chloride by passing gaseous hydrous vinyl chloride over silica gel/alumina gel or physical mixtures thereof.

U.S. Pat. No. 2,266,177 teaches that treating vinyl chloride, prepared by pyrolysis of ethylene chloride, with concentrated sulfuric acid improves the polymerization rate of the resulting vinyl chloride. The patent does not teach the removal of any specific impurity.

Other references which were reported by the Washington associate were the following: U.S. Pat. Nos. 2,266,177; 3,125,607; and 3,142,709. Inasmuch as this second group of references is considered to be less pertinent than the first, it is not believed necessary that they be discussed.

Applicant's invention, as described by the claims, is considered patentable over the pertinent art listed above for the following reasons:

U.S. Pat. No. 2,965,687 does not suggest the use of montmorillonite clay to remove butadiene from vinyl chloride.

U.S. Pat. No. 3,125,608 teaches alumina or silica gel as an inert carrier; thus it does not suggest the use of a silica-alumina catalyst to remove butadiene from vinyl chloride. U.S. Pat. No. 3,125,609 is even less pertinent than U.S. Pat. No. 3,125,608 in that it teaches cupric chloride as a material for removing butadiene from vinyl chloride.

U.S. Pat. No. 3,267,644 is concerned with drying of vinyl chloride. Moreover, it teaches the use of silica gel, alumina gel, or physical mixtures thereof and not a silica-alumina catalyst.

U.S. Pat. No. 2,266,177 teaches the use of a strong acid not an acidic clay. Solely because sulfuric acid purifies vinyl chloride does not indicate that acidic catalysts or clays would necessarily remove butadiene from vinyl chloride. Moreover, there are advantages in using the acidic clays as catalysts, such as less danger in handling the materials.

Brief Summary of the Invention

Briefly, the present invention is directed to a process for the purification of vinyl chloride containing minor amounts of butadiene wherein the process comprises intimately contacting said impure vinyl chloride with a highly acidic silica-alumina catalysts selected from the group consisting of synthetic silica-alumina catalysts and acidic naturally-occurring clays such as montmorillonite and kaolinite.

The term "purification" does not necessarily mean complete removal of the butadiene, but removal of a significant portion of it.

Detailed Description

The impure vinyl chloride which is used in my process can contain up to 100 parts per million butadiene. Usually the amount of butadiene will be much lower, usually less than 25 parts per million. In a typical commercial operation, the butadiene amount will be in the range of 5 to 15 parts per million.

The "purified" vinyl chloride resulting from my process contains less than 5, preferably less than 3, parts per million butadiene.

While the foregoing statements illustrate the preferred embodiments of my invention, it should be readily apparent that the method of my invention will reduce the amount of butadiene in vinyl chloride at even higher concentrations.

Also, it should be apparent that the process is useful at lower concentration. That is, vinyl chloride containing less than 5 parts per million of butadiene will benefit by my process.

The highly acidic silica-alumina catalysts which are used to reduce the amount of butadiene in vinyl chloride according to my process are the following: synthetic silica-alumina catalysts and acidic naturally-occurring clays which are used in the catalytic cracking of petroleum. It is well recognized in the art that these are separate and distinct types of materials. They will now be described in some detail.

Synthetic silica-alumina catalysts are well known. Also, it is well known that these materials are not mere physical mixtures of alumina and silica, but must be prepared in a special manner. Several methods of preparing synthetic silica-alumina catalysts suitable for use in my process are described in the following Book: "Catalysis", edited by Paul H. Emmett — Reinhold Publishing Corp. — New York, 1960. Furthermore, it is known that such catalysts containing large amounts of silica are highly acidic. Suitable silica-alumina catalysts contain from 85 to 90 weight percent silica (as $SiO_2$) and from 10 to 15 weight percent alumina (as $Al_2O_3$). The preferred silica-alumina catalyst contains about 87 weight percent silica (as $SiO_2$) and about 13 weight percent alumina (as $Al_2O_3$), with about 0.3 weight percent impurities.

Of the acidic naturally-occurring clays used in the catalytic cracking of petroleum, acidic montmorillonite and acidic kaolinite are especially suitable. The term "montmorillonite" and "kaolinite" refer to families of clays. The terms are well known in the art and are defined in numerous chemical dictionaries and encyclopedias. The kaolinite clays typically are represented by the formula $$Al_2O_3 \cdot 2SiO_2 \cdot 2H_2O$$

Likewise, the montmorillonite clays typically are represented by the formula $$(Mg,Ca)O \cdot Al_2O_3 \cdot 4SiO_2 \cdot nH_2O$$

These materials are rendered acidic by several means. One means involves ion exchange with acidic ion exchange resins. In another method, the clays are washed with aqueous mineral acid solutions (e.g. hydrochloric acid or sulfuric acid) followed by one or more water washes.

The term "highly acidic" as used herein with regard to the silica-alumina catalysts and the acidic clays refers to those materials having a Hammett acidity (Ho) less than +1.5, usually higher, up to about −8.2. (In the Hammett acidity scale lower values, positive to negative, indicate higher acidity.)

The Hammett acidity measurement is described in "Journal of American Chemical Society," 54, 2721 (1932). The acidity of catalyst surfaces, using the Hammett acidity measurement, is described in an article by H. A. Benesi in "Journal of American Chemical Society," 78, 5490 (1956).

Knowing that silica-alumina catalysts and acidic clays can be used to remove butadiene from vinyl chloride, any person skilled in this art can readily determine the optimum conditions required. In order to provide a more complete disclosure, the following discussion of process conditions is given.

Inasmuch as vinyl chloride and butadiene have boiling points of −12°C and −4.4°C, respectively, the process can be conducted with these materials being in the vapor phase or, by use of pressure, in the liquid phase. The process is usually conducted at temperatures in the range of 50° to 250°C, preferably 75° to 150°C. Since the process usually is conducted with the vinyl chloride being present in vapor phase, it is conducted in a closed system with the butadiene-removing material usually being present in pellet form. For example, a tube is filled with pellets of the butadiene-removing material and vapors of the impure vinyl chloride are passed over the pellets. The extent of contacting required is dependent on the amount of butadiene present. The required flow of impure vinyl chloride over the butadiene-removing material preferably is in the range of 0.05 to 0.5 mole per gram of material per hour.

In order to disclose the nature of the present invention still more clearly, the following illustrative examples will be given. It is to be understood that the invention is not to be limited to the specific conditions or details set forth in these examples except insofar as such limitations are specified in the appended claims.

EXAMPLE 1

This example illustrates the use of silica-alumina catalyst in removing butadiene from impure vinyl chloride containing 10 parts per million butadiene.

The catalyst was a highly acidic one known as Grade 979, available from Davison Chemical Division of W. R. Grace and Company. This catalyst had the following typical properties:

| | |
|---|---|
| Silica (as $SiO_2$) | 87 wt % |
| Alumina (as $Al_2O_3$) | 13 wt % |
| Impurities | 0.3 wt % |
| Surface Area | 400 sq m/gm |
| Pore Volume | 1.0 cc/gm |
| Bulk Density | 25 lbs/cu ft |
| Crushing Strength | 12 lbs |

The apparatus consisted of a preheater and a 30-inch section of ¼ inch stainless steel L-shaped tubing as a reactor. The reactor was filled with the silica-alumina catalyst. After passing through the reactor the vinyl chloride was analyzed by gas chromatography for butadiene content. Several runs were made at varying temperatures and flow rates. The results are shown below.

| Vinyl Chloride Flow Rate (ml/g/min)* | Temperature (°C) | Amount of Butadiene (ppm) |
|---|---|---|
| 11 | 100 | 0 |
| 11 | 125 | 0 |
| 11 | 150 | 0 |
| 34 | 100 | 0.5 |

*g = grams of silica-alumina catalyst

EXAMPLE 2

This example illustrates the use of acidic montmorillonite clay in removing butadiene from impure vinyl chloride containing 10 parts per million butadiene.

The apparatus consisted of a preheater section and a reactor section. The preheater was an 18 inches horizontal 1 inch tube while the reactor was a 24 inches vertical 1 inch tube. The reactor section contained 15 grams of the clay in pellet form.

The vinyl chloride was pumped into the preheater section where it was vaporized at 150°–160°C under a pressure of 100 psi. The heated vinyl chloride vapors were then passed through the reactor at 150°C, after which it was analyzed for butadiene content using gas chromatography.

Using a flow rate of 100 gram/hour of vinyl chloride, the treated vinyl chloride contained 3 parts per million of butadiene.

EXAMPLE 3

Example 2 is repeated using reactor temperatures of 50° to 250°C and flow rates of 0.05 to 0.5 mole of vinyl chloride per gram of clay per hour. The treated vinyl chloride contains from 0 to 3 parts per million of butadiene depending upon the flow rate and temperature.

EXAMPLE 4

Example 2 is repeated using acidic kaolinite clay, reactor temperatures of 50° to 250°C and flow rates of 0.05 to 0.5 mole of vinyl chloride per gram of clay per hour. The treated vinyl chloride contains from 0 to 3 parts per million of butadiene depending upon the flow rate and temperature.

EXAMPLE 5

This example shows that silica is not effective for removing butadiene from vinyl chloride monomer. It also provides another showing that synthetic silica-alumina catalyst is effective.

The apparatus was the same as in Example 2. The vinyl chloride monomer (VCM) contained 10 ppm of butadiene. The run conditions and results were as follows:

| Material tested | Temp. | VCM (moles/g mat/hr) | Butadiene (ppm) |
|---|---|---|---|
| Silica | 150°C | 0.067 | 8–9 |
| Synthetic silica-alumina catalyst (Grace, Grade 979) | 100°C | 0.107 | 0 |

EXAMPLE 6

This example shows that alumina (bauxite) is not effective for removing butadiene from vinyl chloride. The apparatus was the same as in Example 2. The vinyl chloride monomer contained 10 ppm of butadiene. Bauxite granules (Porocel) were heated to 100°C in the stream of VCM (15 ml/g Bauxite/min). GLP analysis showed no butadiene removal.

Thus, having described the invention in detail, it will be understood by those skilled in the art that certain variations and modifications may be made without departing from the spirit and scope of the invention as defined herein and in the appended claims.

I claim:

1. A process for the purification of vinyl chloride containing minor amounts of butadiene which comprises intimately contacting said impure vinyl chloride with a highly acidic silica-alumina catalyst, selected from the group consisting essentially of synthetic silica-alumina catalysts and acidic naturally-occurring clays used in the catalytic cracking of petroleum, at a temperature in the range of 50° to 250°C.

2. The process of claim 1 wherein the vinyl chloride feedstock contains 100 ppm or less of butadiene.

3. The process of claim 2 wherein the material used to purify the vinyl chloride is a synthetic silica-alumina catalyst containing from 85 to 90 weight percent silica and from 10 to 15 weight percent alumina.

4. The process of claim 2 wherein the material used to purify the vinyl chloride is an acidic naturally-occurring clay.

5. The process of claim 3 wherein the treated vinyl chloride contains 5 parts per million or less of butadiene.

6. The process of claim 5 wherein the temperature of the vinyl chloride is about 75° to about 150°C.

7. The process of claim 6 wherein the catalyst is contacted with 0.05 to 0.5 mole of vinyl chloride per gram of synthetic silica-alumina catalyst per hour.

8. The process of claim 4 wherein the treated vinyl chloride contains 5 parts per million or less of butadiene.

9. The process of claim 8 wherein the temperature of the vinyl chloride is about 75° to about 150°C.

10. The process of claim 9 wherein the catalyst is contacted with 0.05 to 0.5 mole of vinyl chloride per gram of acidic naturally-occurring clay per hour.

11. The process of claim 10 wherein the acidic naturally-occurring clay is acidic montmorillonite.

12. The process of claim 10 wherein the acidic naturally-occurring clay is acidic kaolinite.

* * * * *